AMPLIFIER CONTROL CIRCUIT
Filed May 4, 1965
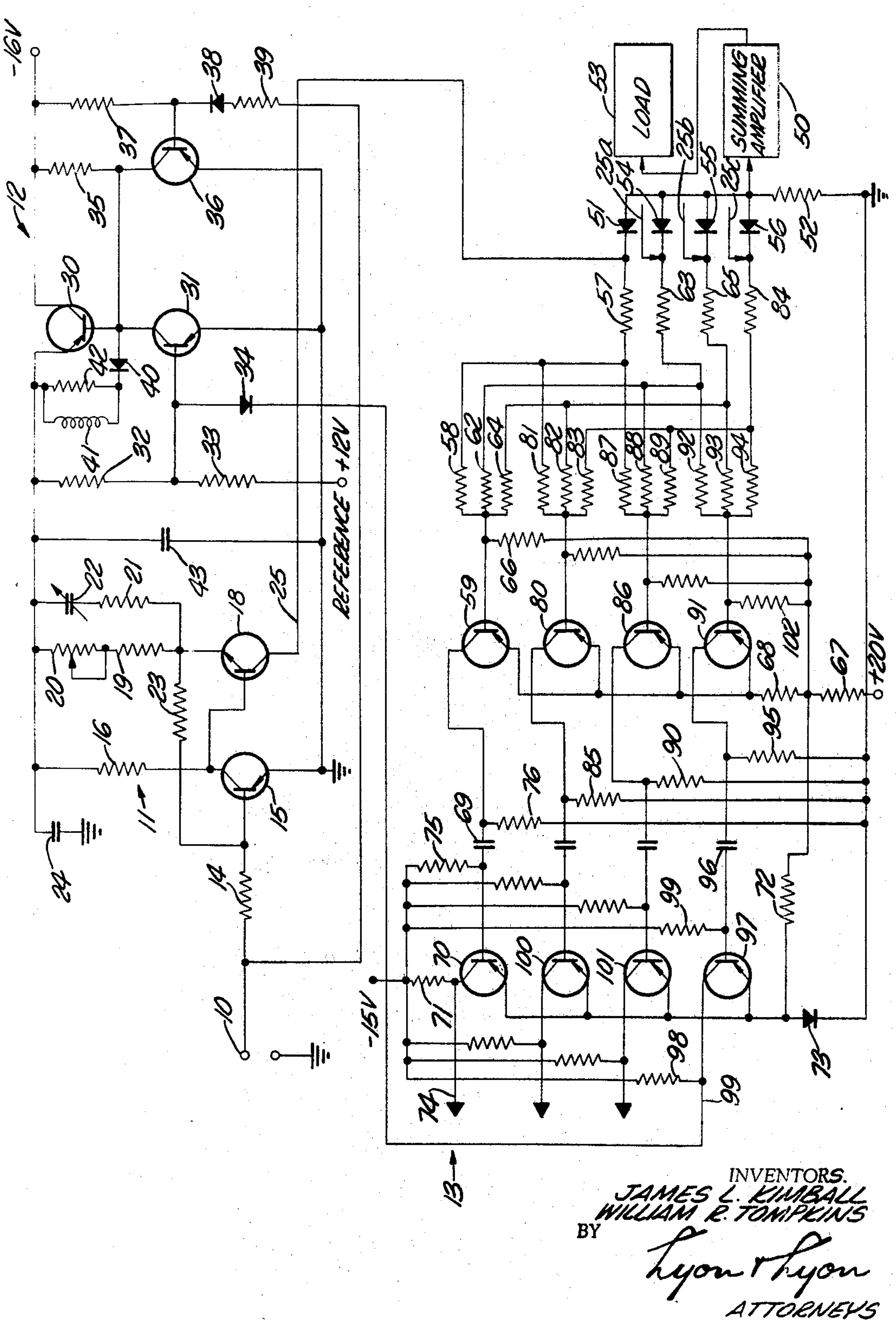
INVENTORS.
JAMES L. KIMBALL
WILLIAM R. TOMPKINS
BY
Lyon & Lyon
ATTORNEYS 3,504,195

AMPLIFIER CONTROL CIRCUIT

James L. Kimball, La Mesa, and William R. Tompkins, San Diego, Calif., assignors to Cohu Electronics, Inc., San Diego, Calif., a corporation of Delaware Filed May 4, 1965, Ser. No. 453,167
Int. Cl. H03k *17/00*
U.S. Cl. 307—243 19 Claims

ABSTRACT OF THE DISCLOSURE

An amplifier powered by a voltage regulator whose series regulating device is rendered non-conducting to de-energize the amplifier when no input is applied thereto or when logic circuitry produces a signal indicating another amplifier feeding a common load is energized.

This invention relates to an amplifier control circuit and more particularly relates to circuitry for de-energizing an amplifier either when no input signals are applied to its input or upon the occurrence of an output signal from associated logic circuitry.

There are many instances were it is desired to feed the output of one of a plurality of signal sources to a single load. In such cases, it is generally necessary that only one signal be applied to the load at a given time and thus means must be provided to block the unwanted signal paths. It is also often desirable to de-energize the signal translating devices, for example, amplifiers, in the unused signal paths so that there is not an excess wastage of power. An example of a system having such requirements is described in an application Ser. No. 453,116 filed on May 4, 1965 by the present inventors and Harold R. Ahrens entitled "Video Switching System" and assigned to the assignee of the present invention, the disclosure of which is incorporated by reference herein.

It is therefore an object of the present invention to provide a system in which an amplifier is automatically de-energized when no signal is applied to its input.

It is also an object of the present invention to provide such a system wherein the amplifier is also de-energized upon the occurrence of an output signal from a logic circuit associated with the load connected to the amplifier.

It is another object of the present invention to provide such a system in which logic circuitry is provided for sensing the energization of one of a plurality of amplifiers connected to a single load and producing an output signal for de-energizing any other amplifiers connected to the same load.

These and other objects and advantages of the present invention will become more apparent upon reference to the accompanying description and drawing, the single figure of which is an electrical schematic diagram of the system of the present invention.

Turning now to the drawing, the input signals are applied to the input terminal 10 of an amplifier 11 whose energizing potential is supplied by a voltage regulator 12. Logic circuitry 13 is provided for sensing when another signal translating device is actuated and de-actuating the voltage regulator 12 and thereby the amplifier 11 in a manner to be described hereinafter. The voltage regulator 12 is also de-actuated when no signal is applied to the terminal 10 as will also be described hereinafter.

The input signal appearing at the terminal 10 is coupled through a resistor 14 to the base of a PNP transistor 15. The emitter of this transistor is grounded and its collector is connected through a resistor 16 to a line 17 which is connected to the voltage regulator 12 and provides the amplifier 11 with a regulated negative potential. The collector of the transistor 16 is also connected to the base of an NPN transistor 18 which is connected in complementary symmetry with transistor 15.

The emitter of the transistor 18 is coupled to the line 17 through a resistor 19 and a variable resistor 20 and through a network consisting of a resistor 21 and an adjustable capacitor 22. The emitter of the transistor 18 is also connected to the base of the transistor 15 through a feedback resistor 23. A capacitor 24 couples the line 17 to ground and thus establishes this line as AC ground. The output of the amplifier appears on the output line 25 connected to the collector of the transistor 18.

The voltage regulator 12 includes a PNP transistor 30 connected in series between a source of negative potential, for example, −16 volts, and the line 17. The base of the transistor 30 is connected to the collector of a PNP transistor 31, the emitter of which is grounded. The emitter of the transistor 30 is also connected to a source of positive voltage, for example, +12 volts, by series connected resistor 32 and 33. The base of the transistor 31 is connected to the junction of resistors 32 and 33. The base of the transistor 31 is also coupled to an output of the logic circuitry 13 by means of a diode 34.

The collector of transistor 30 is coupled by a resistor 35 to the collector of a PNP transistor 36, the emitter of which is grounded. The collector of the transistor 36 is also connected to the base of the transistor 30. The base of the transistor 36 is connected to the negative voltage source by a resistor 37 and is connected to the input terminal 10 of the amplifier 11 by means of a diode 38 and a resistor 39. The base of the transistor 30, and hence the collectors of the transistors 31 and 36, are coupled to the line 17 by a diode 40 and the parallel combination of an inductor 41 and a resistor 42.

The portion of the system thus far described operates in the following manner. The transistors 15 and 18 form a high gain complementary symmetry amplifier having a feedback path through the resistor 23. This circuit is essentially an operational amplifier whose DC voltage output is determined only by the values of the input resistor 14 and the feedback resistor 23. Consequently, the transistor 18 functions as a constant current generator. Because the line 25 will have losses at high frequencies caused by skin effect and the like, the resistor 21 and capacitor 22 are inserted in the emitter circuit of transistor 18. Since the collector current of the transistor 18 equals the emitter current, this resistance-capacitance network can effectively add current to compensate for cable losses at its impedance decreases with increasing frequency while the voltage stays constant because the voltage is determined by resistors 23 and 14. The values of the resistor 21 and capacitor 22 are chosen to approximate as closely as possible the R.F losses in the cable.

With regard to the operation of the voltage regulator 12, if the transistor 36 is not conducting and the transistor 31 has a high gain, any variation in emitter voltage of transistor 30 will cause the potential at the junction of resistors 32 and 33 to change, thereby changing the potential on the base of the transistor 31. This change in the base potential will vary the conductivity of the transistor 31 which results in a change in the potential on the base of the transistor 30 and a consequent change in its conductivity. The change in conductivity of a transistor 30 is opposite in effect to the original fluctuation in output of the regulator 12 and causes the desired output voltage to be re-established. Thus, if transistor 36 does not conduct, the voltage supplied along line 17 to the amplifier 11 will remain constant. The transistor 36 will not conduct so long as its base is kept positive, which will be the case when an input signal is present at the terminal 10 because the base of the transistor 36 is connected to this terminal 10 by diode 38 and resistor 39. The voltage regulator 12 will thus supply a regulated voltage to the amplifier 11 when a positive input appears at the terminal 10.

When no input appears at the terminal 10, the voltage supplied to the input of the amplifier 11 drops to zero and the base of transistor 36 goes sufficiently negative to cause this transistor to saturate. When transistor 36 is turned on in this manner, its collector goes to ground as does the base of the transistor 30. Transistor 30 then ceases to conduct and the voltage supplied to the amplifier 11 goes to near zero with the result that this amplifier is turned off. The rate and shape of decrease of the DC output of the transistor 18, applied by the de-energizing amplifier 11 to the line 25, is controlled by capacitor 43 discharging through the parallel network of inductor 41 and resistor 42, the diode 40 and the transistor 36, after the regulator is switched off by the pulse to the base of transistor 36. The rate of increase of the DC output of the energizing amplifier 11 when a signal appears at its input is controlled by capacitor 43 charging when the regulator is switched on. The inductance-resistance network 41–42 is designed to equalize the charge and discharge rates of capacitor 43.

As pointed out previously, it is often desired that the amplifier 11 be only one of a plurality of feeding a given load. Such a system is indicated in the drawing wherein the output line 25 of the amplifier 11 is connected to the input of a summing amplifier 50 through a diode 51. A line terminating resistor 52 is connected between the diode 51 and the summing amplifier 50 and is provided with an impedance equal to the characteristic impedance of the line 25. The output of the summing amplifier 50 is fed to the load 53 which, for example, may be a television monitor. The output lines **25*a*, 25*b* and 25*c* of additional amplifiers similar to the amplifier 11 are also coupled to the input of the summing amplifier through diodes 54, 55 and 56 respectively. These output lines, together with the output line 25, are also connected to the inputs of the regulator control logic 13**.

The regulator control logic 13 includes a resistor 57 having one end connected to the line 25 and the other end connected through a resistor 58 to the base of a PNP transistor 59. The base of transistor 59 is also connected through resistor 62 and resistor 63 to the output line **25*a* and through resistor 64 and resistor 65 to the output line 25*b*. The base of transistor 59 is also connected through resistors 66 and 67 to a positive source of potential, for example, +20 volts. The emitter of the transistor 59 is also connected to the source of positive potential through a resistor 68 and the resistor 67**.

The collector of transistor 59 is coupled through a capacitor 69 to the base of a PNP transistor 70 whoe collector is connected to a source of negative potential for example, −15 volts, through a resistor 71 and whose emitter is connected to the source of positive potential through resistor 72 and the resistor 67. The emitter of the transistor 70 is also connected to the anode of a diode 73, the cathode of which is grounded. The collector of transistor 70 is also connected through a line 74 to a diode which corresponds to the diode 34 in the amplifier whose output appears on line **25*c*. The base of the transistor 70 is coupled to the negative potential source by a biasing resistor 75 and the collector of transistor 59 is connected to ground through load resistor 76**.

The regulator control logic 13 has four current paths, each of them similar to the one just described. The transistor 80 has its base connected to the input lines **25, 25*b* and 25*c* through resistance networks 81–57, 82–65 and 83–84 respectively and developes its output across resistor 85. The transistor 86 has its base connected to the output lines 25, 25*a* and 25*c* through the resistance networks 87–57, 88–63 and 89–84 respectively and developes its output across resistor 90. The transistor 91 has its base connected to output lines 25*a*, 25*b* and 25*c* through resistance networks 92–63, 93–65 and 94–84 respectively and developes an output signal across the resistor 95. Each of the transistors 59, 80, 86 and 91** is thus connected to the output of three different amplifiers of the four amplifier group.

To follow the signal path of the transistor 91 further, its output is coupled through a capacitor 96 to the base of a PNP transistor 97 which has its collector connected through resistor 98 to the source of negative voltage and its emitter connected through resistor 72 and resistor 67 to the source of positive potential. As was the case with the transistor 70, the emitter of transistor 97 is also coupled through diode 73 to ground. The base of transistor 97 is also connected through a biasing resistor 103 to the source of negative potential. The collector of the transistor 97 is connected by line 99 to the cathode of the diode 34 in the amplifier 11. In a similar manner, the outputs of the transistors 100 and 101 are connected to the corresponding diode in the amplifiers which produce outputs on lines **25*a* and 25*b*** respectively.

The regulator control logic 13 operates in the following manner. Let it be assumed that the amplifier 11 is turned on when one of the other amplifiers associated with the summing amplifier 50 is turned on. Prior to the turning on of this latter amplifier, the cathodes of diodes 54, 55 and 56 will be pulled positive to approximately +20 volts by the source of positive potential and the various resistance networks, such as the network 67, 102, 92 and 63; the network 67, 102, 93 and 65; and the network 67, 102, 94 and 84. The cathode of the diode 51 associated with the active amplifier 11 will be at a negative voltage. This negative voltage will keep transistors 59, 80 and 86 saturated on through resistors 58, 81 and 87. The emitter to collector voltage drop of these transistors is thus at near zero volts and the voltage across the load resistors 76, 85 and 90 is almost 20 volts. Each of these load resistors is AC coupled to its respective output transistor, for example, transistor 70, which is biased into saturation so that its collector is at its emitter voltage which is slightly positive because of the voltage drop across diode 73. The transistor 91, unlike transistors 59, 80 and 86, is not conducting as its base is held at approximately +20 volts.

Assume now that the amplifier feeding output line **25*a* is energized. The voltage at the cathode of diode 54 drops suddenly to a slightly negative value with the result that a large voltage drop occurs across resistors 67, 102, 92 and 63 with a consequent drop in the voltage at the base of transistor 91. This negative pulse at the base of transistor 91 causes this previously non-conducting transistor to conduct. The resulting positive excursion of the collector of transistor 91 is coupled to the base of transistor 97 by the capacitor 96, momentarily turning off the normally saturated transistor 97 and producing a negative pulse at its collector which lasts until the capacitor 96 has charged. The negative going pulse appearing on the line 99 causes the diode 34 to conduct with the result that the transistor 31 is caused to saturate. Saturation of transistor 31 causes it to cease working as a DC amplifier and its collector goes to ground. The base of transistor 30 likewise goes to ground and since it is connected as an emitter follower its output follows its base and also goes to ground, turning off the amplifier 11. The capacitor 43 and the network 40, 41 and 42 serve the same purpose as when the transistor 36** was saturated.

When the amplifier 11 is turned off, the voltage at the cathode of diode 51 will be pulled positive to about +20 volts by the source of positive potential and the various resistance networks. This +20 volts back biases the diode 51 and thereby prevents leakage signals from reaching the summing amplifier 50 and load 53. This greatly attenuates any leakage and eliminates cross talk between the various signal paths.

From the foregoing description, it can be seen that a system has been provided for turning off an amplifier upon the occurrence of either of two eventualities. First, the absence of any signal at the input of the amplifier will result in the amplifier being turned off because its power supply is de-energized. Second, the energization of another amplifier coupled to the same load causes a logic circuit to produce an output pulse which causes the amplifier to be turned off by also deenergizing its power supply. When the amplifier is turned off, a diode which couples it to the load is caused to be back biased to prevent any leakage signals from reaching the load from the amplifier.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A system for de-energizing a signal translating circuit when no input signal is supplied to the input thereof comprising: a source of unregulated voltage; voltage regulating means for supplying regulated voltage to said circuit, said regulating means including a first transistor having an emitter, a collector and a base, the emitter-collector path of said first transistor being connected between one side of said source and said circuit; a second transistor having an emitter, a collector, and a base; means connecting the emitter-collector path of said second transistor across said source; means connecting the collector of said second transistor to the base of said first transistor; a diode; and means coupling said diode between the base of said second transistor and said input of said signal translating circuit whereby said second transistor is rendered non-conductive by the presence of an input signal at said input.

2. A system for de-energizing a signal translating circuit when no input signal is supplied to the input thereof, comprising: a source of unregulated voltage; voltage regulating means for supplying regulated voltage to said circuit, said regulating means including a first transistor having an emitter, a collector, and a base, the emitter-collector path of said first transistor being connected between one side of said source and said circuit; a second transistor having an emitter, a collector, and a base; means coupling the emitter-collector path of said second transistor between the base of said first transistor and the other side of said source, means for sensing variations in the output voltage of said first transistor, and means coupling said sensing means with the base of said second transistor whereby its conductivity is varied by variations in said output voltage; a third transistor having an emitter, a collector, and a base; first resistive means; means coupling said first resistive means and the emitter-collector path of said third transistor across said source, said resistive means being connected to the collector of said third transistors; second resistive means coupled between said one side of said source and the base of said third transistor; a diode; and means coupling said diode between the base of said third transistor and said input of said circuit, said diode being poled to pass input signals to the base of said third transistor whereby said third transistor is rendered non-conductive by the presence of an input signal at said input.

3. A system for de-energizing a signal translating circuit when no input signal is supplied to the input thereof, comprising: a source of unregulated voltage; voltage regulating means for supplying regulated voltage to said circuit, said regulating means including a first transistor having an emitter, a collector and a base, said collector being coupled to one side of said source and said emitter being coupled to said circuit; a second transistor having an emitter, a collector and a base; means connecting the collector of said second transistor to the base of said first transistor; first resistive means connected between the collector of said second transistor and said one side of said source; means connecting the emitter of said second transistor to the other side of said source; second resistive means connected between said one side of said source and the base of said second transistor; a diode; means coupling said diode between the base of said second transistor and said input of said signal translating circuit, said diode being poled to pass input signals to the base of said second transistor whereby said second transistor is rendered non-conductive by the presence of an input signal at said input; and a shaping network connected between the base and emitter of said first transistor, said shaping network including a parallel connected resistor and inductor and a diode poled to pass current when said second transistor conducts.

4. A system for de-energizing one signal translating circuit in a plurality thereof when another circuit of said plurality is energized, comprising: a source of unregulated potential; voltage regulating means for supplying regulated voltage to said one circuit, said regulating means including a first transistor having an emitter, a collector and a base, the emitter-collector path of said first transistor being connected between one side of said source and said circuit; a second transistor having an emitter, a collector and a base; means connecting the emitter-collector path of said second transistor between the base of said first transistor and the other side of said source; means for sensing the energization of another of said signal translating circuits in said plurality and producing an output signal in response thereto; a diode; and means coupling said diode between the base of said second transistor and said sensing means whereby production of an output signal by said sensing means causes said diode to conduct, said second transistor to saturate and said first transistor to be rendered non-conductive.

5. A system for de-energizing one signal translating circuit in a plurality thereof feeding a common load when another circuit in the plurality is energized, comprising: a source of unregulated potential; voltage regulating means for supplying regulated voltage to said one circuit, said regulating means including a first transistor having an emitter, a collector and a base, the emitter-collector path of said first transistor being connected between one side of said source and said circuit, a second transistor having an emitter, a collector and a base, means coupling the emitter-collector path of said second transistor between the base of said first transistor and the other side of said source; means for sensing variations in the output voltage of said first transistor and means coupling said sensing means with the base of said second transistor whereby its conductivity is varied by said variations in said output voltage; means coupling the output of said circuit to said load; means for sensing the energization of another of said signal translating circuits and producing an output signal in response thereto; a diode; and means coupling said diode between the base of said second transistor and said energization sensing means whereby production of an output signal by said energization sensing means causes said diode to conduct, said second transistor to saturate, and said first transistor to be rendered non-conductive.

6. A system for de-energizing one signal translating circuit in a plurality thereof feeding a common load when another circuit in the plurality is energized, comprising: a source of unregulated potential; voltage regulating means for supplying regulated voltage to said one circuit, said regulating means including a first transistor having an emitter, a collector and a base, the collector of said first transistor being connected to one side of said source and its emitter connected to said circuit, a second transistor having an emitter, a collector and a base, means connecting the collector of said second transistor to the base of said first transistor and the emitter of said second transistor to the other side of said source, means for sensing variations in the voltage at the emitter of said first transistor, and means coupling said sensing means with the base of said second transistor whereby its conductivity is varied by said variations in said emitter voltage; means coupling the output of said circuit to said load; logic circuit means for sensing the energization of another of said signal translating circuits and producing an output signal in response thereto; a diode; means coupling said diode between the base of said second transistor and said energization sensing means whereby production of an output signal by said energization sensing means causes said diode to conduct, said second transistor to saturate, and said first transistor to be rendered non-conductive; and a shaping network connected between the base and emitter of said first transistor, said shaping network including a parallel connected transistor and inductor and a diode poled to pass current when said second transistor saturates.

7. A system for de-energizing a signal translating circuit in a plurality thereof feeding a common load when another circuit in the plurality is energized or when no input signal is supplied to the input of said one signal translating circuit, comprising: a source of unregulated voltage; voltage regulating means for supplying regulated voltage to said one circuit, said regulating means including a first transistor having an emitter, a collector and a base, the emitter-collector path of said first transistor being connected between one side of said source and said circuit; a second transistor having an emitter, a collector and a base; means connecting the emitter-collector path of said second transistor across said source; means connecting the collector of said second transistor to the base of said first transistor; a first diode; means coupling said first diode between the base of said second transistor and said input of said signal translating circuit whereby said second transistor is rendered non-conductive by the presence of an input signal at said input; a third transistor having an emitter, a collector and a base; means connecting the emitter-collector path of said third transistor between the base of said first transistor and the other side of said source; means for sensing the energization of another of said signal translating circuits in said plurality and producing an output signal in response thereto; a second diode; and means coupling said second diode between the base of said third transistor and said sensing means whereby production of an output signal by said sensing means causes said second diode to conduct, said third transistor to saturate and said first transistor to be rendered non-conductive.

8. A system for de-energizing one signal translating circuit in a plurality thereof feeding a common load when another circuit in the plurality is energized or when no input signal is supplied to the input of said one signal translating circuit, comprising: a source of unregulated voltage; voltage regulating means for supplying regulated voltage to said one circuit, said regulating means including a first transistor having an emitter, a collector and a base, the emitter-collector path of said first transistor being connected between one side of said source and said circuit, a second transistor having an emitter, a collector and a base, means coupling the emitter-collector of said second transistor between the base of said first transistor and the other side of said source, means for sensing variations in the output voltage of said first transistor, and means coupling said sensing means with the base of said second transistor whereby its conductivity is varied by variations in said output voltage; means coupling the output of said circuit to said load; means for sensing the energization of another of said signal translating circuits and producing an output signal in response thereto; a first diode; means coupling said diode between the base of said second transistor and said energization sensing means whereby production of an output signal by said energization sensing means causes said first diode to conduct, said second transistor to saturate, and said first transistor to be rendered non-conductive; a third transistor having an emitter, a collector and a base; first resistive means; means coupling said first resistive means and the emitter-collector path of said third transistor across said source, said resistive means being connected to the collector of said third transistor; a second resistive means coupled between said one side of said source and the base of said third transistor; a second diode; and means coupling said second diode between the base of said third transistor and said input of said circuit, said second diode being poled to pass input signals to the base of said third transistor whereby said third transistor is rendered non-conductive by the presence of an input signal at said output.

9. A system for de-energizing one signal translating circuit in a plurality thereof feeding a common load when another circuit in the plurality is energized or when no input signal is supplied to the input of said one circuit, comprising: a source of unregulated voltage; voltage regulating means for supplying regulated voltage to said one circuit, said regulating means including a first transistor having an emitter, a collector and a base, the collector of said first transistor being coupled to one side of said source and its emitter being coupled to said circuit, a second transistor having an emitter, a collector and a base, means coupling the collector of said second transistor to the base of said first transistor and the emitter of said second transistor to the other side of said source, means for sensing variation in the voltage at the emitter of said first transistor and means coupling said sensing means with the base of said second transistor whereby its conductivity is varied by said variations in said emitter voltage; means coupling the output of said circuit to said load; means for sensing the energization of another of said signal translating circuits and producing an output signal in response thereto; a first diode; means coupling said first diode between the base of said second transistor and said energization sensing means whereby production of an output signal by said energization sensing means causes said first diode to conduct, said second transistor to saturate, and said first transistor to be rendered non-conductive; a third transistor having an emitter, a collector and a base; means connecting the collector of said third transistor to the base of said first transistor; first resistive means connected between the collector of said third transistor and said one side of said source; means connecting the emitter of said third transistor to the other side of said source; second resistive means connected between said one side of said source and the base of said third transistor; a second diode; means coupling said second diode between the base of said third transistor and said input to said signal translating circuit, said second diode being poled to pass input signals to the base of said third transistor whereby said third transistor is rendered non-conductive by the presence of an input signal at said input; and a shaping network connected between the base and emitter of said first transistor, said shaping network including a parallel connected resistor and inductor and a third diode poled to pass current when said third transistor conducts or said second transistor saturates.

10. Logic circuitry for producing an output signal for de-energizing one signal translating circuit in a plurality thereof when another circuit in said plurality is energized, comprising: a plurality of signal paths corresponding in number to the number of circuits in said plurality, each of said paths including a first transistor having an emitter, a collector and a base, a load resistor, means for passing current through the emitter-collector path of said first transistor and said load resistor, means for connecting the base of said first transistor to the output of all but said one of said circuits, a second transistor having an emitter, a collector and a base, means for normally biasing said second transistor into conduction, capacitor means coupling the output developed across said load resistor to the base of said second transistor, and means coupling the output of said second transistor to said one circuit.

11. Logic circuitry for producing an output signal for de-energizing a signal translating circuit in a plurality thereof when another circuit in said plurality is energized, comprising: a plurality of signal paths corresponding in number to the number of circuits in said plurality, each of said paths including a first transistor having an emitter, a collector and a base, a load resistor, means for passing current through the emitter-collector path of said first transistor and said load resistor, means for connecting the base of said first transistor to the output of all but one of said circuits for biasing said first transistor into conduction if any of said circuits is energized, a second transistor having an emitter, a collector and a base, means for normally biasing said second transistor into conduction, capacitor means coupling the output developed across said load resistor to the base of said second transistor, and means coupling the output of said second transistor to said one circuit, the first transistor in each path having its base connected to the output of a different combination of circuits.

12. Logic circuitry for producing an output signal for de-energizing a signal translating circuit in a plurality thereof connected to a common load when another circuit in said plurality is energized, comprising a plurality of signal paths corresponding in number to the number of circuits in said plurality, each of said paths including a first transistor, a load resistor connected to the collector of said first transistor, a source of voltage, means connecting the emitter-collector path of said first transistor and said load resistor across said source, resistive means connecting the emitter and base of said first transistor, a plurality of individual resistive means each connecting the base of said first transistor to the output of one of said circuits, all but one of said circuits being so connected, a second transistor having an emitter, a collector and a base, means for normally biasing said second transistor into conduction, a capacitor coupling the collector of said first transistor to the base of said second transistor, and means coupling the output of said second transistor to said one circuit; a plurality of diodes, each of said diodes connecting the outputs of one of said circuits to one side of said source, said diodes being poled to prevent the flow of current between the emitter and base of its respective first transistor so that each first transistor will conduct only if one of the circuits to which it is connected is energized, each of said first transistors being connected to the outputs of a different combination of circuits.

13. A system for de-energizing one signal translating circuit in a plurality thereof when another circuit in said plurality is energized, comprising: a source of unregulated potential; voltage regulating means for supplying regulated voltage to said one circuit, said regulating means including a first transistor having an emitter, a collector and a base, the emitter-collector path of said first transistor being connected between one side of said source and said circuit; a second transistor having an emitter, a collector and a base; means connecting the emitter-collector path of said second transistor between the base of said first transistor and the other side of said source; logic circuitry including a third transistor having an emitter, a collector and a base, a load resistor, means for passing current through the emitter-collector path of said third transistor and said load resistor, means for connecting the base of said third transistor to the output of all of said circuits but said one circuit, a fourth transistor having an emitter, a collector and a base, means for normally biasing said fourth transistor into conduction, capacitor means coupling the output developed across said load resistor to the base of said fourth transistor; a diode; and means coupling said diode between the base of said second transistor and the output of said fourth transistor whereby production of an output signal by said fourth transistor causes said diode to conduct, said second transistor to saturate and said first transistor to be rendered non-conductive.

14. A system for de-energizing one signal translating circuit in a plurality thereof feeding a common load when another circuit in the plurality is energized, comprising: a source of unregulated potential; voltage regulating means for supplying regulated voltage to said one circuit, said regulating means including a first transistor having an emitter, a collector and a base, the collector connected to one side of said source and its emitter connected to said one circuit, a second transistor having an emitter, a collector and a base, means connecting the collector of said second transistor to the base of said first transistor and the emitter of said second transistor to the other side of said source, means for sensing variations in the voltage at the emitter of said first transistor, and means coupling said sensing means with the base of said second transistor whereby its conductivity is varied by said variations in said emitter voltage; means coupling the output of said circuit to said load; logic circuitry including a third transistor having an emitter, a collector and a base, a load resistor, means for passing current through the emitter-collector path of said third transistor and said load resistor, means for connecting the base of said third transistor to the output of all of said circuits but said one circuit, a fourth transistor having an emitter, a collector and a base, means for normally biasing said fourth transistor into conduction, capacitor means coupling the output developed across said load resistor to the base of said fourth transistor; a diode; and means coupling said diode between the base of said second transistor and the output of said fourth transistor whereby production of an output signal by said fourth transistor causes said diode to conduct, said second transistor to saturate and said first transistor to be rendered non-conductive; and a shaping network connected between the base and emitter of said first transistor, said shaping network including a parallel connected resistor and inductor and a diode poled to pass current when said second transistor saturates.

15. A system for de-energizing one signal translating circuit in a plurality thereof feeding a common load when another circuit in said plurality is energized or when no input signal is supplied to the input of said one circuit, comprising: a source of unregulated voltage; a voltage regulating means for supplying regulated voltage to said one circuit, said regulating means including a first transistor having an emitter, a collector and a base, the emitter-collector path of said first transistor being connected between one side of said source and said circuit; a second transistor having an emitter, a collector and a base; means connecting the emitter-collector path of said second transistor across said source; means connecting the collector of said second transistor to the base of said first transistor; a first diode; means coupling said first diode between the base of said second transistor and said input of said signal translating circuit whereby said second transistor is rendered non-conductive by the presence of an input signal at said input; a third transistor having an emitter, a collector and a base; means connecting the emitter-collector path of said third transistor between the base of said first transistor and the other side of said source; logic circuitry including a fourth transistor having an emitter, a collector and a base, a load resistor, means for passing current through the emitter-collector path of said fourth transistor and said load resistor, means for connecting the base of said fourth transistor to the ouput of all of said circuits but said one circuit, a fifth transistor having an emitter, a collector and a base, means for normally biasing said fifth transistor into production; capacitor means coupling the output developed across said load resistor to the base of said fifth transistor; a second diode; and means coupling said second diode between the base of said third transistor and the output of said fifth transistor whereby production of an output signal by said fifth transistor causes said second diode to conduct, said third transistor to saturate and said first transistor to be rendered non-conductive.

16. A system for de-energizing one signal translating circuit in a plurality thereof feeding a common load when another circuit in the plurality is energized or when no input signal is supplied to the input of said one circuit, comprising: a source of unregulated voltage; voltage regulating means for supplying regulated voltage to said one circuit, said regulating means including a first transistor having an emitter, a collector and a base, the collector coupled to one side of said source and its emitter coupled to said circuit, a second transistor having an emitter, a collector and a base, means coupling the collector of said second transistor the the base of said first transistor and the emitter of said second transistor to the other side of said source, means for sensing variations in the voltage at the emitter of said first transistor and means coupling said sensing means with the base of said second transistor whereby its conductivity is varied by said variations in said emitter voltage; means coupling the output of said circuit to said load; logic circuitry including a third transistor having an emitter, a collector and a base, a load resistor, means for passing current through the emitter-collector path of said third transistor and said load resistor, means for connecting the base of said third transistor to the output of all of said circuits but said one circuit, a fourth transistor having an emitter, a collector and a base, means for normally biasing said fourth transistor into conduction, capacitor means coupling the output developed across said load resistor to the base of said fourth transistor; a first diode; and means coupling said first diode between the base of said second transistor and the output of said fourth transistor whereby production of an output signal by said fourth transistor causes said first diode to conduct, said second transistor to saturate and said first transistor to be rendered non-conductive; a fifth transistor having an emitter, a collector and a base; means connecting the collector of said fifth transistor to the base of said first transistor; first resistive means connected between the collector of said fifth transistor and said one side of said source; means connecting the emitter of said fifth transistor to the other side of said source; second resistive means connected between said one side of said source and the base of said fifth transistor; a second diode; means coupling said second diode between the base of said fifth transistor and said input to said one signal translating circuit, said second diode being poled to pass input signals to the base of said fifth transistor whereby said fifth transistor is rendered non-conductive by the presence of an input signal at said input; and a shaping network connected between the base and emitter of said first transistor, said shaping network including a parallel connected resistor and inductor and a third diode poled to pass current when said fifth transistor conducts or said second transistor saturates.

17. A system for providing a single input to a load comprising: a plurality of signal translating circuits having outputs connected to said load; a source of unregulated voltage; a plurality of voltage regulating means, each of said regulating means supplying regulated voltage to one of said circuits and including a first transistor having an emitter, a collector and a base, the collector coupled to one side of said source and its emitter coupled to said one circuit, a second transistor having an emitter, a collector and a base, means coupling the collector of said second transistor to the base of said first transistor and the emitter of said second transistor to the other side of said source, means for sensing variations in the voltage at the emitter of said first transistor and means coupling said sensing means with the base of said second transistor whereby its conductivity is varied by said variations in said emitter voltage; a third transistor having an emitter, a collector and a base, means connecting the collector of said third transistor to the base of said first transistor; first resistive means connected between the collector of said third transistor and said one side of said source, means connecting the emitter of said third transistor to the other side of said source, second resistive means connected between said one side of said source and the base of said third transistor, a first diode, and means coupling said first diode between the base of said third transistor and the input to the signal translating circuit, said first diode being poled to pass input signals to the base of said third transistor whereby said third transistor is rendered non-conductive by the presence of an input signal at said input; logic circuitry means including a voltage source and a plurality of signal paths corresponding in number to the number of signal translating circuits, each of said paths including a fourth transistor having an emitter, a collector and a base, a load resistor connected to the collector of said fourth transistor, means connecting the emitter-collector path of said fourth transistor and said load resistor across said voltage source, third resistive means connecting the emitter and base of said fourth transistor, individual resistive means each connecting the base of said fourth transistor to the output of one of said circuits, all but one of said circuits being so connected, a fifth transistor having an emitter, a collector and a base, means for normally biasing said fifth transistor into conduction and a capacitor coupling the collector of said fourth transistor to the base of said fifth transistor; a first plurality of diodes, each of said first plurality of diodes connecting one of said circuit outputs with one side of said voltage source, each of said diodes being poled to prevent the flow of current between the emitter and base of the fourth transistor in each of said paths to which it is connected so that each of said fourth transistors will conduct only if one of the circuits to which it is connected is energized, each of said four transistors being connected by said individual resistive means to the outputs of a different combination of said circuits; and a second plurality of diodes, each diode of said second plurality coupling the output of the fifth transistor in each of said signal paths to the base of the second transistor in the regulating means supplying the signal translating means to which the fourth transistor of said signal path is not connected, whereby production of an output signal by said fifth transistor causes said diode to conduct, said second transistor to saturate and said first transistor to be rendered non-conductive.

18. A system for de-energizing one signal translating circuit of a plurality thereof when another circuit of said plurality is energized, comprising: a source of unregulated voltage; voltage regulating means coupled to said source of unregulated voltage for supplying regulated voltage to said one circuit; means operable to render said voltage regulating means inoperative whereby said one circuit is no longer supplied with voltage; means for sensing the energization of another of said signal translating circuits in said plurality thereof and producing an output signal in response thereto; and means coupling said operable means with said sensing means, said operable means operating upon the production of an output signal from said sensing means.

19. A system for de-energizing one signal translating circuit of a plurality theerof feeding a common load when another circuit of said plurality is energized or when no input is supplied to the input of said one signal translating circuit, comprising: a source of unregulated voltage; voltage regulating means coupled to said source of unregulated voltage for supplying a regulated voltage to said one circuit; first means operable to render said voltage regulating means inoperative whereby said circuit is no longer supplied with voltage; means coupling said input of said one circuit with said first operable means, said operable means operating when no signal appears at said input of said circuit; means for sensing the energization of another of said signal translating circuits in said plurality thereof and producing an output signal in response thereto; second means operable to render said voltage regulating means inoperative whereby said one circuit is no longer supplied with voltage; and means coupling said second operable means with said sensing means, said second operable means operating upon the production of an output signal from said sensing means.

References Cited

UNITED STATES PATENTS 1,708,027 4/1929 Ohl ---------------- 330—51

JOHN S. HYMAN, Primary Examiner

JOHN ZAZWORSKY, Assistant Examiner

U.S. Cl. X.R.

307—297; 328—104, 154; 330—30, 40